June 11, 1935.                J. P. TARBOX                2,004,620
                          PORTABLE WELDING TOOL
              Original Filed May 3, 1932    2 Sheets-Sheet 1

COMPRESSED AIR SOURCE

POWER LINE

INVENTOR.

June 11, 1935.   J. P. TARBOX   2,004,620
PORTABLE WELDING TOOL
Original Filed May 3, 1932   2 Sheets-Sheet 2

INVENTOR.
John P. Tarbox

Patented June 11, 1935

2,004,620

UNITED STATES PATENT OFFICE 2,004,620

PORTABLE WELDING TOOL

John P. Tarbox, Philadelphia, Pa., assignor to Edward G. Budd Manufacturing Company, Philadelphia, Pa., a corporation of Pennsylvania Application May 3, 1932, Serial No. 608,874
Renewed August 20, 1934

4 Claims.  (Cl. 219—4)

The present invention relates to methods of and apparatus for welding and more particularly to short time spot welding such as finds great usefulness in the fabrication of structures from stainless steel.

Its chief object is the provision of a method which makes possible the spot welding of parts so situated or of such shape that opposite sides are not accessible each to one of the usual pair of clamping electrodes carried by a common support reaching around the work, and the provision of means for temporarily pressing an electrode against the work for a time sufficient to make the weld without rigid connection between the work and the electrode holder.

Another object is the provision of a portable spot welding electrode holder and actuator capable of being held in the hand of an operator for applying the electrode against the work under a pressure exerted by the operator sufficient only to firmly abut the electrode against the work, and operable to exert a relatively higher pressure sufficient in degree and in time of duration to effect the weld without substantial added effort from the operator.

A further object is the provision of a portable device of the above type which shall be readily wieldable in locations inaccessible to ordinary stationary welding machines.

The object of the invention is attained through the use of a portable holder support carrying compressed air motor means for exerting pressure between the support and the electrode with a control valve for the motor means and a welding current control device, the support and its appurtenances being freely movable but of such aggregate mass that with the electrode abutting the work, the time required for the support to move away from the electrode though brief will suffice for the making of the weld, while its inertia load acting against the sudden pressure exerted between it and the electrode will enable the requisite pressure to be maintained for such brief time. The current control device operates to close a control circuit for initiating the flow of welding current only after attainment of the requisite electrode pressure, the control circuit when closed resulting in the actuation of a suitable single operation timing device operable to close the welding circuit through the work by way of the electrode and for an interval within the time interval of maintenance of such requisite pressure.

Other objects and advantages of the invention will be apparent from a perusal of the following specification and the drawings accompanying the same.

Figure 1:
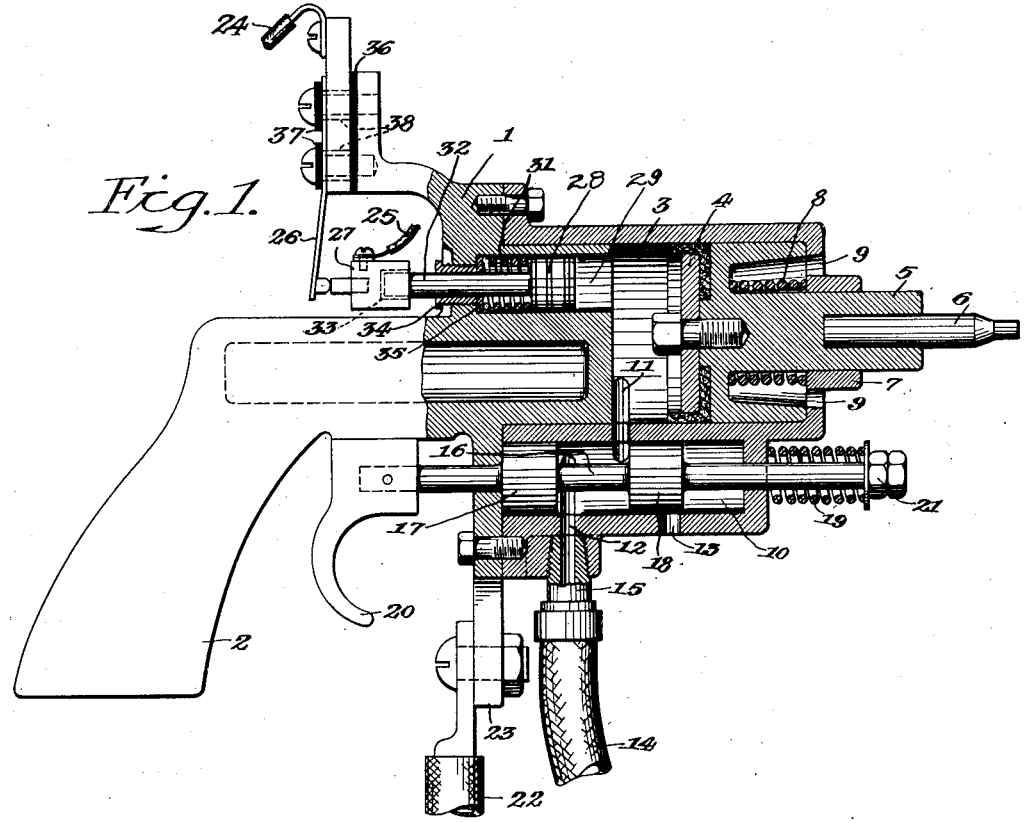
Fig. 1 is a side elevation in partial axial, vertical section through a preferred embodiment of the invention.

Referring to the drawings in detail, and first to Fig. 1, the main body portion 1 which also constitutes the freely movable support for the various parts of the tool, is arranged to be held in the hand of the worker by a suitable handle or grip 2. Opposite the grip is mounted a motor element in the form of a work cylinder 3 carrying a piston 4 which in turn carries the piston stem 5. The piston stem 5 also functions as an electrode holder to carry the electrode 6. The outer end of the work cylinder 3 is provided with a thickened portion 7 which acts as a guide for the piston stem 5 and an abutment for the compression spring 8, the left hand end of said spring bearing against the piston so as to tend to normally hold the piston at the back of the cylinder.

Several breather openings 9 are provided in the end wall of the cylinder to permit rapid relative movement of this end of the cylinder wall in the piston toward each other. For controlling the supply and exhaust of suitable pressure fluid, preferably compressed air, to the interior of the working cylinder 3, a valve chamber 10 is formed below the work cylinder communicating therewith through the port 11. The valve chamber 10 is also provided with inlet and exhaust ports 12 and 13, respectively, the exhaust port 13 opening to atmosphere while the inlet port 12 communicates with the flexible air conduit 14 through coupling 15. The valve chamber 10 is also provided with a double piston valve 16 having an inlet control piston member 17 and an exhaust control piston member 18, the inlet member 17 being arranged to open and close the inlet port 12 simultaneously with the closing and opening, respectively, of the exhaust port 13. It is desirable for proper operation of the device that the rush of compressed air or other fluid under pressure to the work cylinder 3 be extremely sudden and to this end the port 11 in the work cylinder and the inlet port 12 in the valve chamber are given a large cross sectional area, the inlet port 12 being made large in cross section, but relatively narrow in the direction of movement of the inlet valve piston member 17 so that it will have a high rate of opening and will reach its full opening with relatively slight movement of the inlet piston member 17. The double piston valve member 16 is shown in its actuated position, that is, in the position permitting the flow of compressed air from the flexible conduit 14 into the work cylinder 3 and is arranged to be moved into this position against the tension of the valve spring 19 by the trigger 20, it being understood that normally, the valve spring 19 bearing against the cap nuts 21 normally holds the piston valve 16 in the extreme right hand position with the inlet port 12 covered by the valve element 17 and the exhaust port 13 uncovered due to the valve member 18 being in the extreme right hand position and to the right of the exhaust opening. Electrical connection is established with the electrode 6 through a suitable welding circuit conductor 22 secured to a connecting lug 23 on the main support 1 through which a circuit connection to the electrode 6 is established through the metallic body of the support 1, the work cylinder 3 and the piston and its stem to the electrode 6.

As the tool is to be used in spot welding, where it is necessary to withhold the application of current until the electrode is in contact with the work and held thereagainst under suitable working pressure, it is necessary to use a suitable timing switch operable to switch the welding current on for a given time after contact under the necessary pressure has been established. For the timed control of the welding circuit I prefer to use an automatic timing switch operable upon each actuation to effect the delivery of a single impulse or charge of welding current, accurately controlled as to time and intensity. Such timing machines are adapted to be controlled by a control circuit such that each closure of the control circuit, as by a push button or the like, results in but one operation of the switching device for each closure of the control circuit regardless of the length of time the control circuit may be held closed. Inasmuch as it is simply the control of such a timing apparatus which forms a part of the present invention and not the timing apparatus itself, only the control circuit and the switch means therefor are herein shown.

Control circuit conductors included in such a control circuit are indicated at 24 and 25 and are arranged to be electrically connected to complete the circuit through the stationary contact element 26 and movable contact element 27, respectively. In order that these contacts may be closed only upon the attainment of a given predetermined pressure of the electrode 6 against the work, I provide a suitable pressure responsive device in the form of the contact piston 28 slidably mounted in a side cylinder chamber 29 which communicates with the work cylinder 3, movement of the piston 28 to the left under pressure from the work cylinder being resisted by the compression spring 31, so that its movement to the left will be proportional to the pressure in the work cylinder and consequently proportional to the pressure against the work piston and the pressure of the electrode against the work. For operating the contact 27 in response to movement of the contact piston 28, this contact is connected with the piston through the piston stem 32 but insulated therefrom by a suitable insulating thimble 33. As all the parts are here shown in actuated position, the contacts 26—27 are shown closed with the piston 28 held under pressure from the work cylinder 3. For varying the tension on the compression spring 31 so as to adjust the piston 28 to respond to different predetermined pressures in the work cylinder, I provide a sleeve member 34 fitting slidably around the piston stem 32 and through the support 1 in threaded engagement therewith to a slidable spring bearing member 35 against which the left-hand end of the spring 31 abuts. The tension of the spring 31 may thus be adjusted by turning the sleeve member 34 to the right or left as desired. The contact 26 is suitably insulated from the support 1 by the strip 36, washers 37 and sleeves 38 of insulating material.

Figure 2:
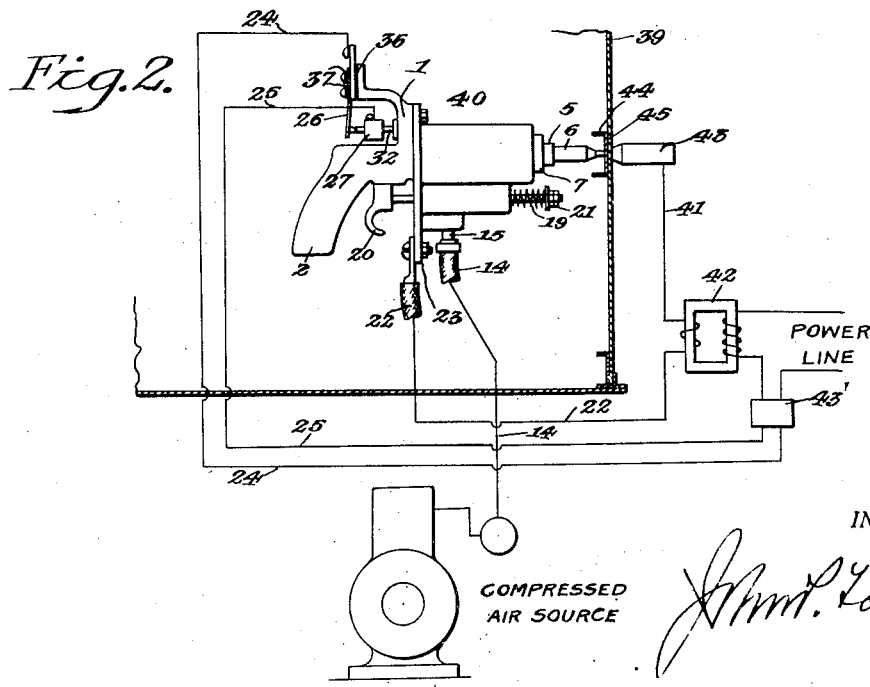
Fig. 2 is a circuit diagram including the device as shown in Fig. 1 and illustrating the manner of use.

For a clearer understanding of the operation of the device of Fig. 1, reference is to be had to Fig. 2 which shows diagrammatically a complete operative system including the tool shown in Fig. 1. Here the structure being fabricated such as the hull of a boat or a sheet metal tank, is indicated at 39. The tool which is indicated as a whole at 40 is shown applied to the work from the inside of the structure being fabricated. The supply conduit 14 is shown connected to a suitable source of compressed air, and the welding circuit conductors 22 and 41 connected to the secondary of a welding transformer 42, the conductor 41 being arranged to complete the circuit connection to the side of the work opposite the tool 40 through relatively massive contact element 43. The primary of the welding transformer is connected to a suitable power line through a suitable automatic timing switch 43' preferably of the type above referred to, the control circuit of which is extended through conductors 24 and 25 to the contacts 26, 27 of the welding tool 40.

In operation, assuming the parts to be in their normal unactuated positions, that is with the piston valve 16 held over to the right under tension of valve spring 19, the inlet 12 closed, the work cylinder 3 open to atmosphere through ports 11 and 13, the work piston 4 in its extreme left hand position and the contact piston 28 in its extreme right hand position with the contacts 26—27 open the tool 40 with its freely movable support 1 and its appurtenances is held freely in the workman's hand by the grip 2, and is positioned to place the electrode 6 against the elements 44 and 45 of the work to be welded together. The operator now pulls the trigger 20 which opens the inlet valve port 12 and closes the exhaust valve port 13, whereupon compressed air rushes into the working cylinder 3 from the compressed air source by way of the conduit 14, coupling 15, inlet port 12 and cylinder port 11. The sudden inrush of compressed air to the work cylinder sets up a rapidly increasing pressure therein which is exerted between the piston 4 and the support 1 tending to push them away from each other. As the electrode 6 is abutted against the work, the relatively massive support 1 and its appurtenances are forced away from the electrode with an accelerating velocity exerting a re-active pressure on the electrode 6 during such accelerating movement of the support. Thus while the application of pressure on the electrode is of brief duration, it is not of the instantaneous nature of the sudden impact of a hammer blow where the total energy stored up by momentum is dissipated in an instant, but is rather in the nature of a re-active push concurrent with the application of power and representing the re-active force resulting from the application of power and the overcoming of inertia as distinguished from the dissipation of power stored by momentum. Due to the limited relative movement between the support and the electrode, the time interval though not instantaneous as in the case of a percussive blow, is extremely brief but still sufficient to cover the current interval necessary for the making of an effective spot welding, especially in the welding of stainless steel and like material which is the chief use contemplated for the present invention. Such periods are in the range of 1/60 of a second and even considerably less, for example 1/100 and less. As soon as the pressure in the working cylinder 3 attains that value which represents the proper pressure for the electrode 6, the valve piston 28 is moved to the left a sufficient distance to close the contacts 26—27 which closes the control circuit to the timing switch 43', which circuit may be traced from timing switch 43', over conductor 24, contact 26, contact 27, conductor 25 and back to timing switch 43'. The timing switch is thus caused to operate to close the primary circuit of the transformer 42 for the predetermined brief interval of time desired, which as above stated is well within the period of time during which pressure is maintained on the electrode 6. The closure of the primary circuit of the welding transformer causes current to flow to the work over the welding circuit which may be traced from the primary of the welding transformer 42, over conductor 22, body of support 1, electrode 6, elements 44—45 of the work, the massive electrode 43 and back over conductor 41 to the transformer primary. The brief flow of welding current being completed and the weld made, the support 1 reaches the end of its travel away from the tool 6, whereupon the operator releases the trigger 20. Release of the trigger permits the piston valve 16 to move over to the right under tension of the valve spring 19 causing the valve element 17 to close the inlet port 12 and the valve 18 to move to the right exposing the exhaust port 13, thus permitting the work cylinder to exhaust to atmosphere by way of cylinder port 11 and exhaust port 13. Reduction of pressure in the cylinder 3 permits the contact piston to return to the right hand position under tension of spring 31 and the work piston 4 to return to its extreme left hand position under tension of the compression spring 8. Movement of the contact piston 28 to the right again opens the control contacts 26—27.

Figure 3:
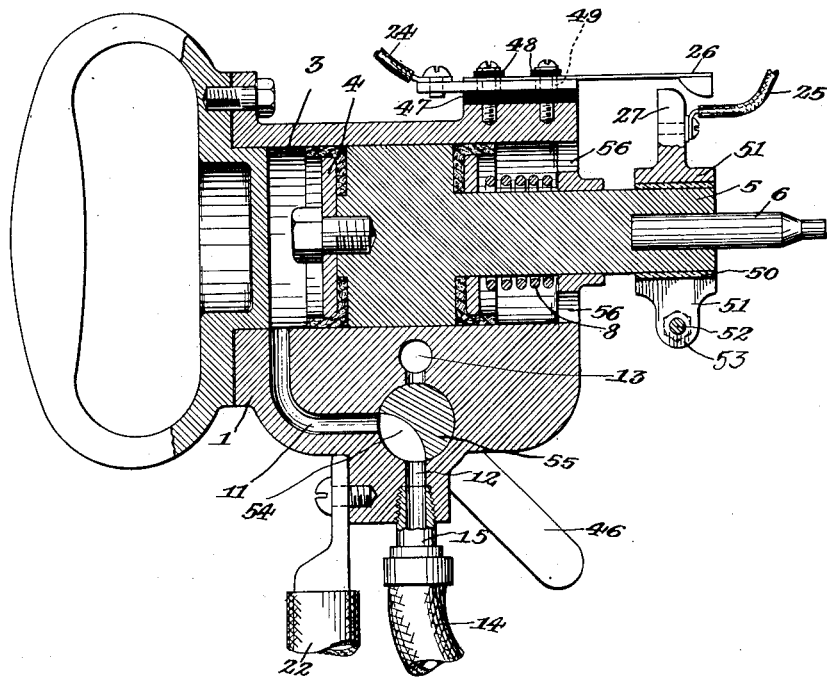
Fig. 3 is a similar view of a modification.

The modification of Fig. 3 is in general similar to Fig. 2 except that the valve 55 controlling the supply and exhaust of compressed air to and from the work cylinder 3 is in the form of a rotary valve controlled by a swinging handle 46, and that the contacts 26 and 27 for closing the control circuit 24—25 are actuated in the movement of the piston 4 instead of through a special contact piston, as in Fig. 1. The work piston with its restoring compression spring 8 thus acts as the pressure responsive means for actuating the contacts 26—27. The contact 26 is insulated in a manner similar to that of Fig. 1, namely, by a suitable strip 47, washers 48 and sleeves 49 of insulating material. Contact 27 is insulated from the piston stem 5 by the sleeve 50 of insulating material interposed between the valve stem 5 and the split ring 51 which carries the contact 27, the split ring being clamped on to the valve stem by a suitable clamping screw 52 passing through the lugs 53 on opposite ends of the split ring, the screw 52 being arranged to draw the lugs together and clamp the split ring about the stem in the usual manner. Adjustment of the contact 27 on the stem 5 can thus be effected by releasing the clamping action of the split ring and sliding it with the contact 27 along the stem to give the proper spacing between contacts 26 and 27 after which the split ring is again tightened about the stem 5.

The operation of the arrangement of the modification shown in Fig. 3 is the same as that of Fig. 1 except that after the inrush of pressure into the work cylinder 3 the control circuit is not closed until after a given movement of the support 1 away from the electrode 6. Such movement of course indicates the attainment of a given pressure so that the control circuit is not closed until such given pressure is attained. In Fig. 3 the parts of the device are shown in a position intermediate the normal and extreme operative position with the valve handle 46 in the inlet position and the contacts 25—26 about to engage. The connection from the compressed air supply conduit 14 to the interior of the work cylinder 3 is established through the inlet port 12, valve port 54 and cylinder port 11, while the exhaust port 13 is closed off from the cylinder port 11 by the body of the valve element 55. Breather openings 56 are embodied in the right hand end of the work cylinder to permit free and rapid movement of the piston 4 against the tension of the compression spring 8 which latter is given just sufficient strength to act as restoring means for the piston.

While I have herein shown certain specific embodiments of my invention and applications thereof, it is to be understood that the invention is not limited to such specific forms and uses but contemplates all such modifications and variants thereof as fall fairly within the scope of the appended claims.

What I claim is:

1. The method of spot welding without the necessity of rigidly clamping the work between the electrodes, which comprises applying an electrode to one side of the work between the work and a free moving mass, applying a force between the electrode and the mass to move the mass away from the electrode, utilizing the reaction pressure exerted during the accelerating movement of the mass to press the electrode against the work, and passing a welding current through the work by way of the electrode only during a time interval within the time of said accelerated movement.

2. A portable spot welding tool comprising a relatively large mass supporting structure, a relatively small mass electrode carrier, means arranged to provide relative motion between said support and carrier, and control means governing said relative motion, means arranged whereby said relative motion is very rapid in response to said control means, and means arranged to control the energization of a welding circuit of said tool solely within the time duration of said relative motion.

3. A welding tool comprising a freely movable support adapted to be held in the hand, an electrode holder carried by said support having substantially less mass than said support, means for moving said electrode holder relative to said support and circuit control means actuated by the movement of said electrode holder for controlling the welding circuit, the inertia of said support serving with the reaction pressure of said electrode holder to provide the necessary welding pressure.

4. The method of spot welding work, one side of which is relatively inaccessible, which comprises placing an electrode against the work on the inaccessible side thereof, placing a second electrode opposite said first electrode on the accessible side of the work, introducing fluid pressure upon said second electrode sufficient to produce the necessary welding pressure and simultaneously closing a welding circuit through said electrodes and the interposed work, the fluid pressure exerted being in the nature of an impact.

JOHN P. TARBOX.